United States Patent
Kumar et al.

(10) Patent No.: US 11,917,475 B2
(45) Date of Patent: Feb. 27, 2024

(54) IDLE MODE CELL RESELECTION PRIORITY CONFIGURATIONS

(71) Applicant: QUALCOMM INCORPORATED, San Diego, CA (US)

(72) Inventors: Sanjay Kumar, Bharatpur (IN); Uttam Vyas, Hyderabad (IN); Muralidharan Murugan, Hyderabad (IN); Sham Sunder Kantayapalem, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 17/539,747

(22) Filed: Dec. 1, 2021

(65) Prior Publication Data

US 2023/0171659 A1 Jun. 1, 2023

(51) Int. Cl.
*H04W 36/08* (2009.01)
*H04W 36/00* (2009.01)
*H04W 76/30* (2018.01)

(52) U.S. Cl.
CPC ....... *H04W 36/08* (2013.01); *H04W 36/0077* (2013.01); *H04W 36/0094* (2013.01); *H04W 76/30* (2018.02)

(58) Field of Classification Search
CPC ..... H04W 36/08; H04W 76/27; H04W 76/30; H04W 36/0077; H04W 36/0094; H04W 36/06; H04W 36/0085; H04W 36/0061; H04W 36/0055; H04W 36/00835; H04W 36/0083; H04W 36/0016; H04W 36/00; H04W 36/0005
See application file for complete search history.

(56) References Cited

U.S. PATENT DOCUMENTS

| | | | |
|---|---|---|---|
| 2015/0109946 A1* | 4/2015 | Sharma | H04W 36/00835 370/252 |
| 2021/0127325 A1* | 4/2021 | Shih | H04W 48/16 |
| 2022/0191779 A1* | 6/2022 | Bergqvist | H04W 24/10 |
| 2022/0338135 A1* | 10/2022 | Kim | H04W 52/365 |
| 2023/0354128 A1* | 11/2023 | Lee | H04W 36/0058 |

* cited by examiner

*Primary Examiner* — Allahyar Kasraian
(74) *Attorney, Agent, or Firm* — Haynes and Boone, LLP

(57) ABSTRACT

Methods and mechanisms for performing idle mode mobility procedures are provided. According to one aspect of the present disclosure, a method for wireless communication performed by a user equipment (UE) includes: receiving, from a base station (BS) on a first cell, system information indicating a first cell reselection priority configuration; receiving, from the BS, dedicated signaling indicating a dedicated cell reselection priority configuration, wherein the dedicated cell reselection priority configuration is empty; and connecting, while in an idle mode and in response to the dedicated cell reselection priority configuration being empty, to a second cell different from the first cell based on the first cell reselection priority configuration received in the system information.

30 Claims, 6 Drawing Sheets

IDLE MODE CELL RESELECTION PRIORITY CONFIGURATIONS

TECHNICAL FIELD

This application relates to wireless communication systems, and more particularly to user equipment (UE) idle mode mobility in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Maintaining mobility is important in a wireless communication network, where a UE may travel from one coverage area or cell to another coverage area or cell. In general, a UE may be in an idle state or a connected state with respect to a network. An idle mode UE is not attached to any BS and there are no network and/or radio resources allocated to the UE. The UE's location is known to the network, for example, within a group of cells referred to as a tracking area. While a UE is not attached to any BS, the UE may select a suitable cell to camp on. The procedure of a UE selecting and camping on a cell is referred to as cell selection. While camping on a cell, the UE continues to monitor other cells. When the UE detects a degradation in the received signal quality from the currently camped cell, for example, due to mobility, the UE may decide to camp on another cell. The procedure of evaluating and reselecting another cell while the UE is currently camped on a serving cell is referred to as cell reselection.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method for wireless communication performed by a user equipment (UE) includes: receiving, from a base station (BS) on a first cell, system information indicating a first cell reselection priority configuration; receiving, from the BS, dedicated signaling indicating a dedicated cell reselection priority configuration, wherein the dedicated cell reselection priority configuration is empty; and connecting, while in an idle mode and in response to the dedicated cell reselection priority configuration being empty, to a second cell different from the first cell based on the first cell reselection priority configuration received in the system information.

According to another aspect of the present disclosure, a user equipment (UE) includes: a processor and a transceiver in communication with the processor, wherein the processor and the transceiver are configured to: receive, from a base station (BS) on a first cell, system information indicating a first cell reselection priority configuration; receive, from the BS, dedicated signaling indicating a dedicated cell reselection priority configuration, wherein the dedicated cell reselection priority configuration is empty; and connect, while in an idle mode and in response to the dedicated cell reselection priority configuration being empty, to a second cell different from the first cell based on the first cell reselection priority configuration received in the system information.

According to another aspect of the present disclosure, a non-transitory, computer-readable medium includes program code recorded thereon. The program code comprises instructions executable by a processor to cause a user equipment (UE) to: receive, from a base station (BS) on a first cell, system information indicating a first cell reselection priority configuration; receive, from the BS, dedicated signaling indicating a dedicated cell reselection priority configuration, wherein the dedicated cell reselection priority configuration is empty; and connect, while in an idle mode and in response to the dedicated cell reselection priority configuration being empty, to a second cell different from the first cell based on the first cell reselection priority configuration received in the system information.

According to another aspect of the present disclosure, a user equipment (UE) includes: means for receiving, from a base station (BS) on a first cell, system information indicating a first cell reselection priority configuration; means for receiving, from the BS, dedicated signaling indicating a dedicated cell reselection priority configuration, wherein the dedicated cell reselection priority configuration is empty; and means for connecting, while in an idle mode and in response to the dedicated cell reselection priority configuration being empty, to a second cell different from the first cell based on the first cell reselection priority configuration received in the system information.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while

DETAILED DESCRIPTION

Figure 1:
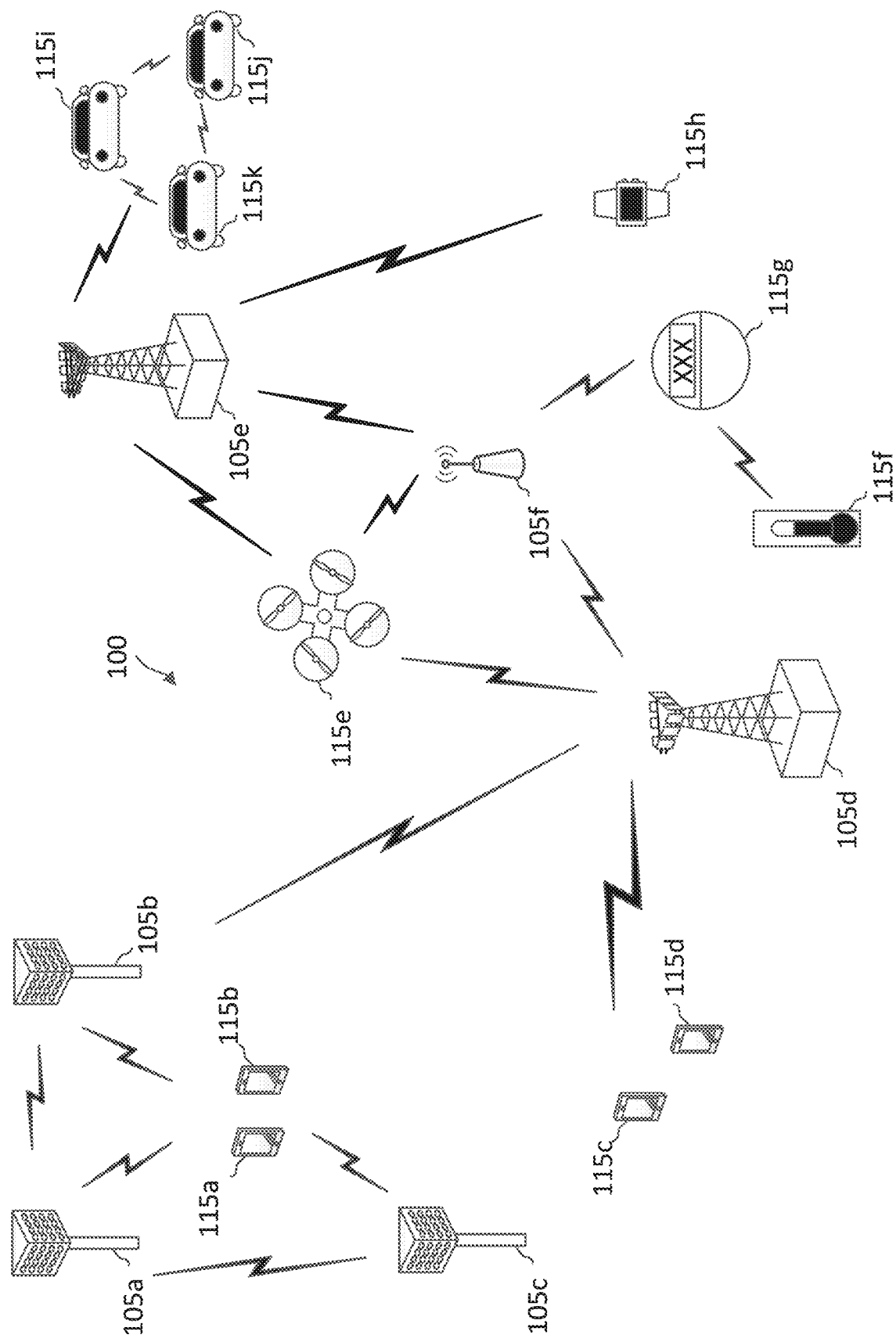
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OF-DMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a BS may broadcast system information, for example, in the form of master information block (MIB) and system information blocks (SIBs). The system information includes essential or critical information, such as downlink (DL) channel configuration information, uplink (UL) channel configuration information, cell selection and reselection priorities, and/or mobility control information for a UE to access the network. For example, a UE may occasionally monitor neighboring cells to determine whether a higher priority cell, or a more suitable cell, is available for connection. In one example, the UE may perform a mobility procedure after moving into an idle mode or state. The UE may change to the idle state in response to receiving dedicated signaling from the BS on the first cell, such as a connection release message. The connection release message may include an information element (IE), which may include a mobility control information IE and/or a cell reselection priority IE. The IE may indicate dedicated cell reselection priorities for the UE. In some aspects, the UE may be configured to ignore or disregard the cell reselection priorities indicated in the system information, and instead use the dedicated cell reselection priorities indicated in the connection release message.

The mobility procedure may include identifying, based on the dedicated reselection priority information indicated in the dedicated signaling, one or more neighboring cells as candidates for reselection. The system information may also indicate a priority associated with each cell. For example, the system information may indicate, for each of one or more neighboring cells, and integer ranging from 0 to 7, where the integer value indicates the priority of that cell. The UE may tune to the frequency associated with each cell and perform signal measurements of reference signals transmitted by the cells. If a cell with a higher priority than the currently camped cell satisfies signal power and/or signal quality thresholds, the UE may reselect that cell by initiating a connection protocol, such as a random access channel (RACH) procedure.

In some instances, the BS may transmit dedicated signaling, such as a connection release message, that includes empty mobility control information and/or cell reselection priority information. For example, in LTE, the BS may transmit a RRCConnectionRelease message including idleModeMobilityControlInfo information element (IE). The idleModeMobilityControlInfo IE may typically indicate cell reselection priorities for each of one or more candidate neighboring cells. In NR, the BS may transmit a CellReselectionPriorities IE indicating the cell reselection priorities for each of one or more candidate neighboring cells. However, any suitable IE may be used to indicate a cell reselection priority configuration or reselection priority information. The IE indicating the cell reselection priority information may also indicate one or more timers that can be used in a cell mobility procedure. However, in some instances, the cell reselection priority information/configuration of the IE may be empty, such that it does not indicate cell reselection priorities for any neighboring candidate cells. Further, the IE may not include any timers, in some instances. For example, the timers may include a T320 timer. The T320 timer may be initiated during reselection to a cell associated with a different radio access technology (RAT) than the current serving cell. In some aspects, a UE may be configured to discard cell reselection priority information provided by the dedicated signaling at the expiration of the T320 timer.

If the cell reselection priority IE (e.g., IdleModeMobilityControlInfo, CellReselectionPriorities, etc.) is empty, the UE may not have any reselection priority information to use in a mobility protocol. In this regard, because the UB may disregard cell reselection priority information indicated in the system information, the empty cell reselection priority IE in the dedicated signaling may leave the UE without a cell reselection aortic configuration to use for the mobility procedure. This may cause the UE to remain camped on the current cell, even if the network conditions of the current cell are poor or suboptimal.

The present disclosure describes schemes and mechanisms for performing cell reselection while in an idle mode or state. For example, in one aspect, a UE may receive, on a first cell from a BS, system information indicating a first cell reselection priority configuration. The UE may receive the system information while in a connected mode or state on the first cell. The UE may then receive dedicated signaling indicating a dedicated cell reselection priority configuration. If the dedicated cell reselection priority configuration is empty, the UE may use the first cell reselection priority configuration indicated in the system information. Accordingly, the UE may perform an idle mode mobility procedure using the first cell reselection priority configuration to reselect to a different cell while in idle mode.

Aspects described in the present disclosure provide several advantages. In one aspect, the reselection priority configuration schemes described herein allow for a more flexible approach to cell reselection whereby a UE can reselect to a better cell even if the dedicated cell reselection priority configuration is empty. In this regard, the mechanisms of the present disclosure may allow the UE to identify and rank candidate neighboring cells while in an idle mode even if the dedicated signaling causing the UE to enter the idle mode may include empty dedicated reselection priority information. Thus, the reliability of communications, network performance, and user experience may be improved.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for wireless communication devices such as the UE 115e, which may be a flying wireless communication device. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a MIB, remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as a RRC connection. When the UE 115 is actively exchanging data with the BS 105, the UE 115 is in a RRC connected state.

In an example, after establishing a connection with the BS 105, the UE 115 may initiate an initial network attachment procedure with the network 100. The BS 105 may coordinate with various network entities or fifth generation core (5GC) entities, such as a access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs), which may also be referred to as routing notification areas (RNAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115. When the UE 115 has no active data communication with the BS 105 after the network attachment, the UE 115 may return to an idle state (e.g., a RRC idle state). During an idle state, the UE 115 may perform channel measurements, perform cell reselection, update TA/RNA location, and/or monitor a paging channel. Mechanisms for performing initial cell selection and cell reselection are described in greater detail herein.

Figure 2:
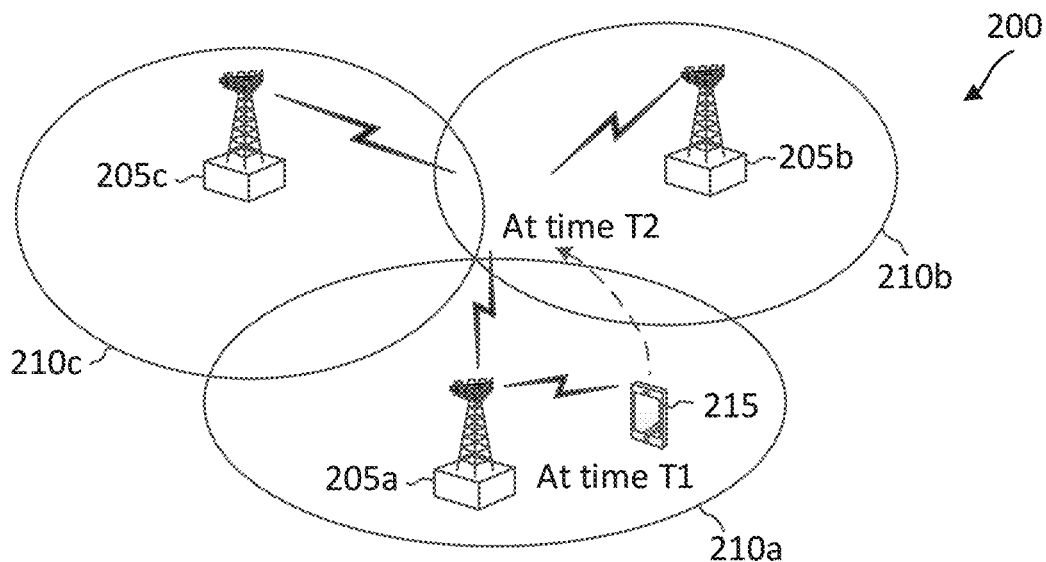
FIG. 2 illustrates a wireless communication network according to some embodiments of the present disclosure.
Figure 3:
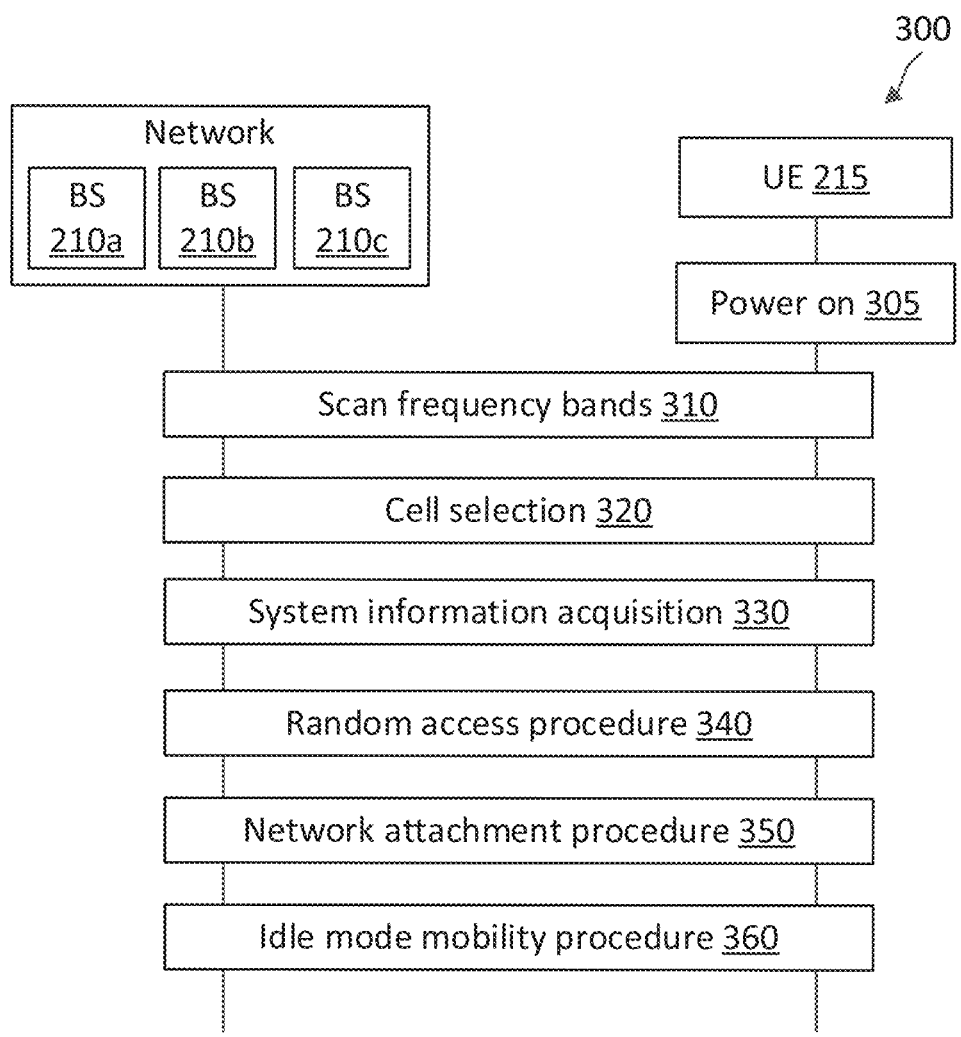
FIG. 3 is a signaling diagram illustrating a cell selection and cell reselection method according to embodiments of the present disclosure.

FIGS. 2 and 3 illustrate an initial cell selection and cell reselection scenario. FIG. 2 illustrates a wireless communication network 200 according to some embodiments of the present disclosure. The network 200 may correspond to a portion of the network 100. FIG. 2 illustrates three BSs 205 (individually labeled as 205a, 205b, and 205c), three cells 210 (individually labeled as 210a, 210b, and 210c), and one UE 215 for purposes of simplicity of discussion, though it will be recognized that embodiments of the present disclosure may scale to many more UEs 215 and/or BSs 205. The BSs 205 are similar to the BSs 105. The UE 215 is similar to the UEs 115. The BS 205a provides service in a coverage area or cell 210a. The BS 205b provides service in a coverage area or cell 210b. The BS 205c provides service in a coverage area or cell 210c.

As an example, at time T1, the UE 215 is activated when the UE 215 is in the coverage of the cell 210a. The UE 215 performs an initial cell selection procedure and camp on the cell 210a based on channel measurements and certain selection criteria. While camping on the cell 210a, the UE 215 may search for a better cell 210 to camp on, for example, due to mobility of the UE 215 (at time T2) as shown by the dashed arrow. Mechanisms for performing initial cell selection and cell reselection (e.g., mobility in idle mode) are described in greater detail herein.

FIG. 3 is a signaling diagram illustrating an initial cell selection and cell reselection method 300 according to embodiments of the present disclosure. The method 300 is employed by the network 200. The method 300 is implemented by the UE 215 and the BSs 205a, 205b, and 205c. Steps of the method 300 can be executed by computing devices (e.g., a processor, processing circuit, and/or other suitable component) of the BS 205a, 205b, and 205c and the UE 215. The BSs 205a, 205b, and 205c may be referred to as a network. The network may further include core network components, such as SGW, 5GC, and AMF entities. As illustrated, the method 300 includes a number of enumerated steps, but embodiments of the method 300 may include additional steps before, after, and in between the enumerated steps. In some embodiments, one or more of the enumerated steps may be omitted or performed in a different order.

At step 305, the UE 215a is powered on from a power-off state. For example, the UE 215a is being activated while positioned in the coverage area of the cell 210a at time T1 as shown in FIG. 2.

At step 310, after transitioning from the power-off state to the power-on state, the UE 215a scans a list of available radio frequency (RF) bands or channels. During the frequency scan, the UE 215a measures receive signal quality (e.g., received signal strength indicator (RSSI)) for each detected cell (or BSs 205a, 205b, and 205c) on the frequency bands. For example, the BSs 205a, 205b, and 205c may broadcast PSSs, SSSs, system information (e.g., MIBs and SIBs), and/or reference signals for respective cells 210, and the UE 215a may determine receive signal quality from the broadcast signals. In some instances, the BSs 205a, 205b, 205c may operate in different frequency bands. In some other instances, the BSs 205a, 205b, 205c may operate in the same frequency band. In some instances, the BSs 205a, 205b, 205c may use different radio access technologies (RATs), for example, including LTE and 5G NR. In some other instances, the BSs 205a, 205b, 205c may use the same RAT. The UE 215a may select candidate cells or BSs 205 that provide receive signal quality greater than a certain threshold. The UE 215a may synchronize to each candidate cell and decode broadcast information (e.g., physical cell identity (PCI), public land mobile network (PLMN), TAU information) from the candidate cell.

At step 320, the UE 215a performs a cell selection. The UE 215a may select a suitable cell based on the cell information received from the frequency scan. The UE 215a may select a cell that belongs to a certain PLMN (e.g., a registered PLMN), not barred from access, belongs to at least one TA that is not forbidden, and/or satisfies certain cell selection criteria (e.g., satisfying certain reference signal received power (RSRP) and/or reference signal received quality (RSRQ) requirements). For example, the UE 215a may select the cell 210a served by the BS 205a. The selected cell 210a may be referred to as the serving cell or source cell for the UE 215a. The scanning of available frequency bands at step 310 and the cell selection step 320 may be generally refer to as an initial cell selection.

At step 330, after selecting the cell 210a, the UE 215a may continue to acquire system information from the selected cell 210a.

At step 340, the UE 215a performs a random access procedure with the BS 205a. For example, the UE 215a may exchange a random access preamble, a random access response, a RRC connection request, and a RRC connection response with the BS 205a as described above.

At step 350, after completing the random access procedure and establishing a RRC connection with the network, the UE 215a initiates a network attachment procedure with the network. For example, the BS 205a may coordinate with the core network components to identify, authenticate, and authorize the UE 215 for sending and/or receiving data in the network and assign the UE 215a with a group of TAs as described above. Once the network attachment procedure succeeds, a context is established for the UE 215a in the network. When the network attachment procedure is completed, a network session is established between the network and the UE 215a. If the UE 215a has no data to send or receive after the network session is established, the UE 215a may transition to a RRC idle mode and camp on the cell 210a.

At step 360, the UE 215a performs an idle mode mobility procedure. While camping on the cell 210a, the UE 215a may monitor and evaluate receive signal power or quality from the serving cell 210a (e.g., the BS 205a). When the RSRP or the RSRQ from the serving cell 210a falls below a certain threshold, the UE 215a may monitor or evaluate receive signal power or quality from neighboring cells (e.g., the cells 210b and 210c) to search for a better cell for camping. In an example, the UE 215a may identify neighboring cells based on system information received from a previous cell search, or a previously camped cell, and/or monitoring from the current serving cell 210a.

As described above, a BS may broadcast system information (e.g., MIBs and SIBs) to enable a UE to access the network. In an example, a SIB type one (SIB1) provides scheduling information and/or availability of other SIB types and/or information (e.g., PLMN information and/or cell barring information) that can guide a UE in performing cell selection and/or cell reselection. For example, the UE 215a may search for a suitable cell based on SIB1 information received from the BS 205a.

Some examples for the other SIB types may include a SIB type two (SIB2), a SIB type three (SIB3), a SIB type four (SIB4), and a SIB type five (SIB5). A SIB2 provides information for cell reselection that are common for inter-frequency cell reselection, intra-frequency cell reselection, and inter-radio access technology (inter-RAT) cell reselection. For example, a SIB2 may include measurement thresholds for a UE to determine when to start searching for another cell, cell priorities for cell reselection, and/or various cell reselection criteria and/or thresholds. A SIB3 provides neighboring cell related information for intra-frequency cell reselection. For example, the SIB3 includes physical cell identifier (ID) information associated with an intra-frequency neighboring cell and/or corresponding criteria for cell reselection. A SIB4 provides neighboring cell related information for inter-frequency cell reselection. For example, the SIB4 includes physical cell ID, frequency carrier, frequency band, and/or beam information associated with an inter-frequency neighboring cell and/or corresponding criteria for cell reselection. A SIB5 provides neighboring cell related information for inter-RAT cell reselection. For example, the SIB5 includes RAT, frequency carrier, frequency band, and/or beam information associated with an inter-RAT neighboring cell and/or corresponding criteria for cell reselection. An example of an inter-RAT cell reselection may include a UE camped on an NR cell and reselecting to camp on an LTE cell or camping. Alternatively, a UE camped on an LTE cell may reselect to camp on an NR cell. In some instances, an inter-RAT cell reselection may be based on UE's preferences.

In an example, when the cell 210b is an intra-frequency neighboring cell of the cell 210a, the SIB3 may include information to guide a UE 215 to reselect to the cell 210b. Alternatively, when the cell 210b is an inter-frequency neighboring cell of the cell 210a, the SIB4 may include information to guide a UE 215 to reselect to the cell 210b. Yet alternatively, when the cell 210b is an inter-RAT neighboring cell of the cell 210a, the SIB5 may include information to guide a UE 215 to reselect to the cell 210b.

In an example, the UE 215 may move away from the camped cell 210a. The UE 215 may start to search for another cell for camping when the measured received signal power and/or the received signal quality from the currently camped cell 210a falls below a certain threshold. During the search, the UE 215 may measure received signal power and/or received signal quality from the currently camped cell 210a and other candidate cells (e.g., the cells 210b and 210c) which are qualified to be considered for cell reselection. For example, a candidate cell may not be a blacklisted cell or a cell barred from access. The UE 215 may rank the candidate cells based on certain ranking rules or cell reselection priorities associated with the candidate cells in addition to the channel measurements. When the received signal power and/or the received signal quality measured from any of the qualified cells becomes better than the currently camped cell 210a by a certain amount (e.g., based on a hysteresis) and remains better than the currently camped cell 210a for a predefined time duration, the UE 215 changes to camp on the better cell.

The UE 215 may autonomously make the cell camping decision based on cell reselection criteria based on system information received from the serving cell BS 205a. In an example, a SIB2 can include an s-IntraSearchP threshold, an s-IntraSearchQ threshold, an s-NonIntraSearchP threshold, and/or an s-NonIntraSearchQ threshold for beginning a cell search. For example, when the received signal power of the currently camped cell falls below the s-IntraSearchP threshold and/or when the received signal quality of the currently camped cell falls below the s-IntraSearchQ threshold, the UE 215 may search and/or monitor for an intra-frequency candidate cell. When the received signal power of the currently camped cell falls below the s-NonIntraSearchP threshold and/or when the received signal quality of the currently camped cell falls below the s-NonIntraSearchQ threshold, the UE 215 may search and/or monitor for an inter-frequency candidate cell or an inter-RAT candidate cell. SIB2 can also include a threshServingLowQ threshold for triggering a new cell to be reselected, a q-Hyst parameter for the hysteresis, a Qoffset parameter for ranking intra-frequency neighboring cells, and/or a t-Reselection timer parameter for the predefined time duration. SIB2 can further include various measurement parameters, such as the number of SSBs to measure or average for the channel measurements, the beam indices and/or corresponding thresholds, cell reselection priorities, and/or any other related cell reselection configuration parameters as described in the 3GPP document TS 38.331 Release 15, titled "3$^{rd}$ Generation Partnership Project; Technical Specification Group Radio Access Network; NR; Radio Resource Control (RRC) protocol specification," Jan. 14, 2019, which is incorporated herein by reference.

Referring to the example shown in FIG. 2, the UE 215 travels away from the cell 210a towards the cell 210b. At time T2, the UE 215 is closer to BS 205b than the BSs 205c, and thus may receive a stronger received signal quality and/or a stronger received signal power from the BS 205b than the BSs 205a and 205c. The UE 215 may reselect the cell 210b for camping based on the channel measurements and cell reselection parameters/criteria included in the system information received from the BS 205a.

Figure 4:
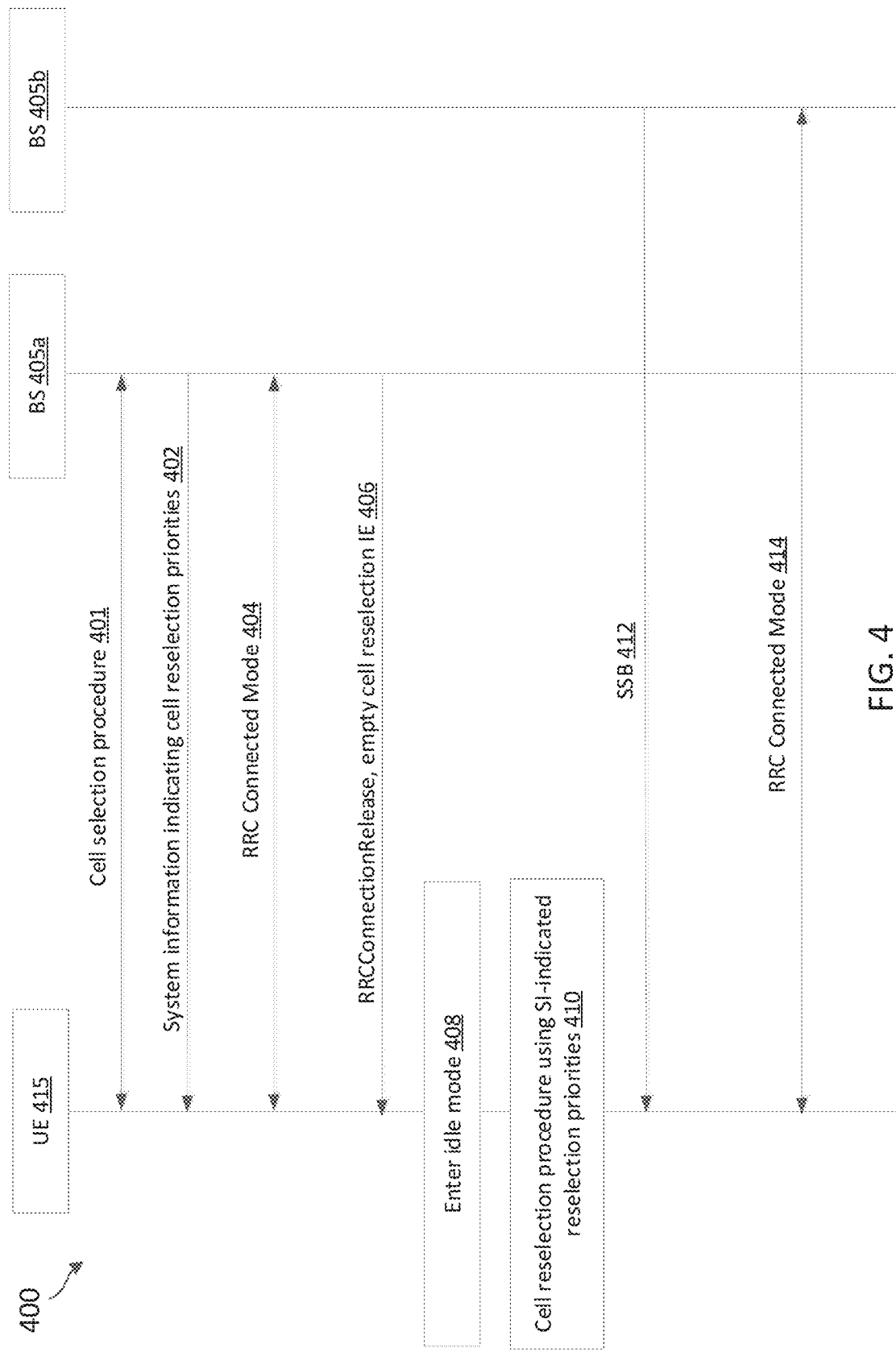
FIG. 4 is a signaling diagram illustrating an idle mode mobility method according to embodiments of the present disclosure.

FIG. 4 is a signaling diagram illustrating an idle mode mobility method according to aspects of the present disclosure. The method 400 may be employed by the network 100 and/or the network 200. The method 400 may be implemented by a UE 415 and the BSs 405a and 405b. The UE 415 may include one of the UEs 115 of the network 100, the UE 215 of the network 200, and/or the UE 500. Each of the BSs 405 may be one of the BSs 105 of the network 100, one of the BSs 205 of the network 200, and/or the BS 600. The first BS 405a may be associated with a first cell and/or a first network, and the second BS 405b may be associated with a second cell different from the first cell and/or a second network different from the first network. Steps of the method 400 can be executed by computing devices (e.g., a processor, processing circuit, and/or other suitable component) of the BSs 405a, 405b, the UE 415. Each BS 405a, 405b may be associated with a same core network, or with different core networks. The network may further include core network components, such as SGW, 5GC, and AMF entities. As illustrated, the method 400 includes a number of enumerated steps, but embodiments of the method 400 may include additional steps before, after, and in between the enumerated steps. In some embodiments, one or more of the enumerated steps may be omitted or performed in a different order.

At action 401, the UE 415 and the first BS 405a perform a cell selection procedure. For example, the UE 415 may select a suitable cell based on the cell information received from the frequency scan. Action 401 may include scanning available frequency bands based on cell selection priorities. The UE 415 select a cell that belongs to a certain PLMN (e.g., a registered PLMN), not barred from access, belongs to at least one TA that is not forbidden, and/or satisfies certain cell selection criteria (e.g., satisfying certain reference signal received power (RSRP) and/or reference signal received quality (RSRQ) requirements). For example, the UE 415 may select a first cell served by the first BS 405a based on the cell satisfying the cell selection criteria. The selected first cell may be referred to as the serving cell or source cell for the UE 415.

At action 402 the first BS 405a transmits, and the UE 415 receives, system information indicating cell reselection priorities. In some aspects, action 402 includes transmitting a master information block (MIB) and/or a system information block (SIB) message indicating the reselection priorities. For example, action 402 may include receiving, from the BS 405 on the first cell, a SIB1, SIB2, SIB3, SIB4, SIB5, SIB24, and/or any other suitable SIB message. In other aspects, receiving the system information includes receiving a master information block (MIB) indicating the first cell reselection priority configuration. The system information may identify one or more neighboring cells, and indicate, for each of the one or more neighboring cells, a value associated with the reselection priority of that cell. For example, the first cell reselection priority configuration may indicate an integer value from 0 to 7, where 7 is the highest priority value and 0 is the lowest priority value. In some aspects, the first cell reselection priority configuration may further indicate a reselection sub-priority for each cell. The reselection sub-priority may include or indicate a fractional value to be added to the priority value described above. The UE 415 may be configured to evaluate neighboring cells based on the indicated cell reselection priority configuration. For example, the UE 415 may be configured to evaluate a neighboring cell with a higher priority than the connected cell to determine if the higher-priority neighboring cell meets the signal energy and/or quality criteria for reselection. If the UE 415 determines that the higher priority cell satisfies the signal energy (e.g., RSRP) and/or quality (RSRQ) criteria, the UE 415 may establish a connection with the higher priority cell and camp on that cell.

At action 404, the UE 415 and the first BS 405a are in a RRC connected mode. The first BS 405a corresponds to a first cell. Accordingly, the UE 415 and the first BS 405a may communicate in a first frequency band. In RRC_CONNECTED, the UE 415 is connected to the core network associated with the first BS 405a. Further, the RRC context is established and the parameters involved with communications between the UE 415 and the network are known to the UE 415 and the first BS 405a. The UE 415 and the first BS 405a may communicate using discontinuous reception (DRX) to conserve power. In the connected mode or state, moving between DRX and active data communication may be relatively simple.

At action 406, the BS 405 transmits, and the UE 415 receives, a connection release message including empty cell reselection priority IE. In one example, action 406 includes receiving a RRCConnectionRelease message. The UE may be configured to enter an idle mode in response to receiving the connection release message. In one aspect, the connection release message includes or indicates a cell reselection priority IE. The cell reselection priority IE may be empty. For example, the connection release message may include idleModeMobilityControlInfo, CellReselectionPriorities, and/or any other suitable IE associated with dedicated cell reselection priority configurations. In some instances, receiving the cell reselection priority IE may indicate, to the UE, that a dedicated cell reselection priority configuration is present in the connection release message. However, the cell reselection priority IE may be empty, such that no neighboring cells are identified and/or no dedicated reselection priorities for any neighboring cells are indicated in the connection release message. In some aspects, the mobility control information may also indicate no timers (e.g., T320 timer) for performing the cell reselection.

At action 408, the UE 415 enters an idle mode in response to the connection release message received at action 406. In some aspects, the idle mode may be a RRC_IDLE mode. In the idle mode, the UE 415 may not be prepared to transmit and/or receive data to/from the network. Further, the RRC context including the parameters involved with communicating with the network, may not be present in the idle mode. In some aspects, the UE 415 may be configured to perform mobility procedures in the idle mode to identify and connect to neighboring cells that meet cell reselection criteria.

At action 410, the UE 415 performs a cell reselection procedure using the cell reselection priorities indicated in the system information received in action 402. In some aspects, the cell reselection procedure may include an idle mode mobility procedure. The cell reselection procedure may include monitoring and evaluating receive signal power or quality from the serving cell and/or from neighboring cells to search for a better cell for camping. For example, the UE 415 may receive and measure a reference signal, such as a synchronization signal block (SSB) from a second BS 405b associated with a different cell at action 412. In other aspects, the second BS 405b may transmit a channel state indicator reference signal (CSI-RS) at action 412. The second cell of the second BS 405b may correspond to a different priority than the first cell associated with the first BS 405a. For example, the second cell may have a higher reselection priority or rank than the first cell. In some aspects, the UE 415 may rank candidate cells based on ranking rules and/or the cell reselection priorities associated with the candidate cells in addition to the channel measurements. When the received signal power and/or the received signal quality measured from any of the qualified cells becomes better than the currently camped cell by a certain amount (e.g., based on a hysteresis) and remains better than the currently camped cell for a predefined time duration, the UE 415 may reselect to that cell.

At action 414, the UE 415 performs a connection protocol to establish a RRC Connection status or mode with the second cell via the second BS 405b. For example, the UE 415 may transmit a RACH preamble (message 1), receive a random access response message (message 2), transmit a connection request (message 3), and receive a connection response (message 4).

Figure 5:
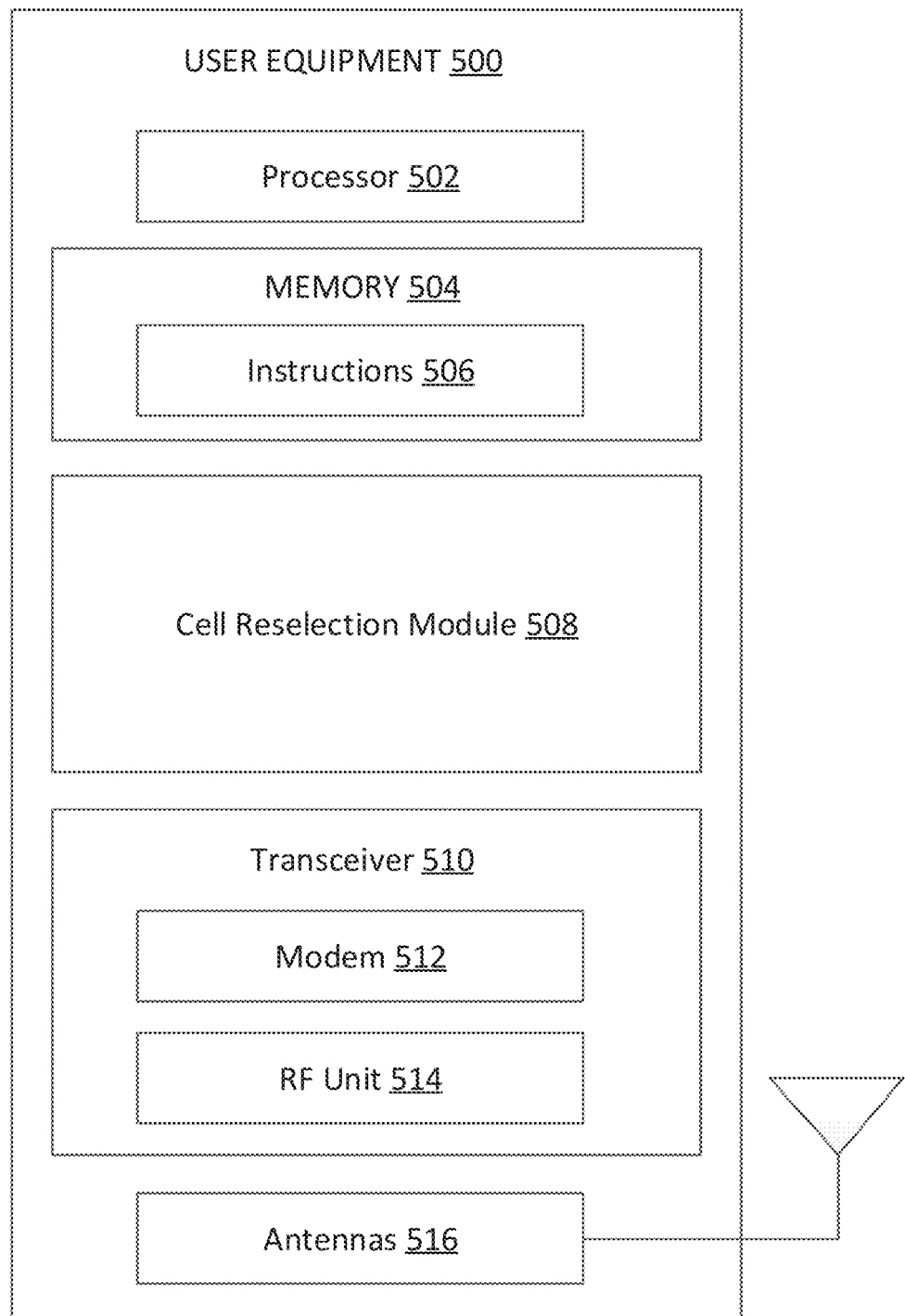
FIG. 5 is a block diagram of a user equipment (UE) according to some embodiments of the present disclosure.

FIG. 5 is a block diagram of an exemplary UE 500 according to embodiments of the present disclosure. The UE 500 may be a UE 115 in the network 100, a UE 215 in the network 200, and/or the UE 415 as discussed above. As shown, the UE 500 may include a processor 502, a memory 504, a cell reselection module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with embodiments of the present disclosure, for example, aspects of FIGS. 3 and 6-11. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The cell reselection module 508 may be implemented via hardware, software, or combinations thereof. For example, the cell reselection module 508 may be implemented as a processor, circuit, and/or instructions 506 stored in the memory 504 and executed by the processor 502. In some examples, the cell reselection module 508 can be integrated within the modem subsystem 512. For example, the cell reselection module 508 can be implemented by a combination of software components (e.g., executed by a DSP or a general processor) and hardware components (e.g., logic gates and circuitry) within the modem subsystem 512.

The cell reselection module 508 may be used for various aspects of the present disclosure, for example, aspects of FIGS. 2-4. For example, the cell reselection module 508 may be configured to receive, from a base station (BS) on a first cell, system information indicating a first cell reselection priority configuration. In some aspects, the UE 500 may be in an active or connected mode with the network via the BS. For example, the UE 500 and the BS may be in a RRC Connected mode. In some aspects, receiving the system information may include receiving s system information block (SIB) message indicating the first cell reselection priority configuration. For example, the cell reselection module 508 may be configured to receive, from the BS on the first cell, a SIB1, SIB2, SIB3, SIB4, SIB5, SIB24, and/or any other suitable SIB message. In other aspects, the cell reselection module 508 may be configured to receive a master information block (MIB) indicating the first cell reselection priority configuration. The first cell reselection priority configuration may indicate, for each of one or more neighboring cells, a value associated with the reselection priority of that cell. For example, the first cell reselection priority configuration may indicate an integer value from 0 to 7, where 7 is the highest priority value and 0 is the lowest priority value. In some aspects, the first cell reselection priority configuration may further indicate a reselection sub-priority for each cell. The reselection sub-priority may include or indicate a fractional value to be added to the priority value described above. The cell reselection module 508 may be configured to evaluate neighboring cells based on the indicated cell reselection priority configuration. For example, the cell reselection module 508 may be configured to evaluate a neighboring cell with a higher priority than the connected cell to determine if the higher-priority neighboring cell meets the signal energy and/or quality criteria for reselection. If the cell reselection module 508 determines that the higher priority cell satisfies the signal energy (e.g., RSRP) and/or quality (RSRQ) criteria, the cell reselection module 508 may establish a connection with the higher priority cell and camp on that cell.

In another aspect, the cell reselection module 508 is configured to receive, from the BS, dedicated signaling indicating a dedicated cell reselection priority configuration, where the dedicated cell reselection priority configuration is empty. In some aspects, receiving the dedicated signaling includes receiving the dedicated signaling via a RRC communication or message. In other aspects, receiving the dedicated signaling includes receiving a media access control-control element (MAC-CE), and/or a MAC protocol data unit (PDU). In one example, receiving the dedicated signaling includes receiving a connection release message, such as a RRCConnectionRelease message. The cell reselection module 508 may be configured to cause the UE 500 to enter an idle mode in response to receiving the connection release message. In one aspect, the dedicated signaling includes or indicates a cell reselection priority IE. For example, the dedicated signaling may include an idleModeMobilityControlInfo IE or a CellReselectionPriorities IE that is empty. In some aspects, the mobility control information field may also indicate no timers (e.g., T320 timer) for performing the cell reselection. Accordingly, the UE may enter an idle mode and initiate a cell search and/or idle mode mobility protocol to identify a suitable cell.

In another aspect, the cell reselection module 508 is configured to connect, while in an idle mode and in response to the dedicated cell reselection priority configuration being empty, to a second cell based on the first cell reselection priority configuration. The second cell may be different from the first cell. In some aspects, the cell reselection module 508 is configured to determine, based on the dedicated signaling, whether the dedicated cell reselection priority configuration is empty. For example, the dedicated signaling may include a RRCConnectionRelease message carrying idleModeMobilityControlInfo. The cell reselection module 508 may determine whether the idleModeMobilityControlInfo indicates any reselection priorities for any neighboring cells, and/or whether the idleModeMobilityControlInfo indicates a T320 timer. Based on determining that the idleModeMobilityControlInfo is empty (i.e., does not include or indicate any dedicated cell reselection priorities), the cell reselection module 508 may perform an idle mode mobility procedure to evaluate neighboring cells based on the priorities indicated in the system information. In another example, the dedicated signaling may include a RRC message carrying CellReselectionPriorities. The cell reselection module 508 may determine whether the CellReselectionPriorities indicates any reselection priorities for any neighboring cells, and/or whether the CellReselectionPriorities indicates a T320 timer. Based on determining that the CellReselectionPriorities is empty (i.e., does not include or indicate any dedicated cell reselection priorities), the cell reselection module 508 may perform an idle mode mobility procedure to evaluate neighboring cells based on the priorities indicated in the system information.

In some aspects, the cell reselection module 508 is configured to measure, based on the first cell reselection priority configuration, at least one of a signal power (e.g., RSRP) or a signal quality (e.g., RSRQ), and compare the at least one of the signal power or the signal quality to a corresponding threshold. In some aspects, the cell reselection module 508 may identify or select, based on the system information, the second cell associated with a higher priority than the connected cell. The cell reselection module 508 may then tune to the frequency band associated with the second cell, and perform the signal power and/or signal quality measurements. If the signal power and/or signal quality measurements satisfy the corresponding threshold(s) and the measured second cell is associated with a higher priority than the connected first cell, the cell reselection module 508 may initiate a cell reselection procedure to camp on the second cell. In some aspects, the first cell and the second cell may be associated with a same radio access technology (RAT). In other aspects, the first cell and the second cell may be associated with different RATs. For example, the first cell may be an LTE cell, and the second cell may be an NR cell.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the cell reselection module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The antennas 516 may include multiple antennas of similar or different designs in order to sustain multiple transmission links. The RF unit 514 may configure the antennas 516.

In an embodiment, the UE 500 can include multiple transceivers 510 implementing different RATs (e.g., NR and LTE). In an embodiment, the UE 500 can include a single transceiver 510 implementing multiple RATs (e.g., NR and LTE). In an embodiment, the transceiver 510 can include various components, where different combinations of components can implement RATs.

Figure 6:
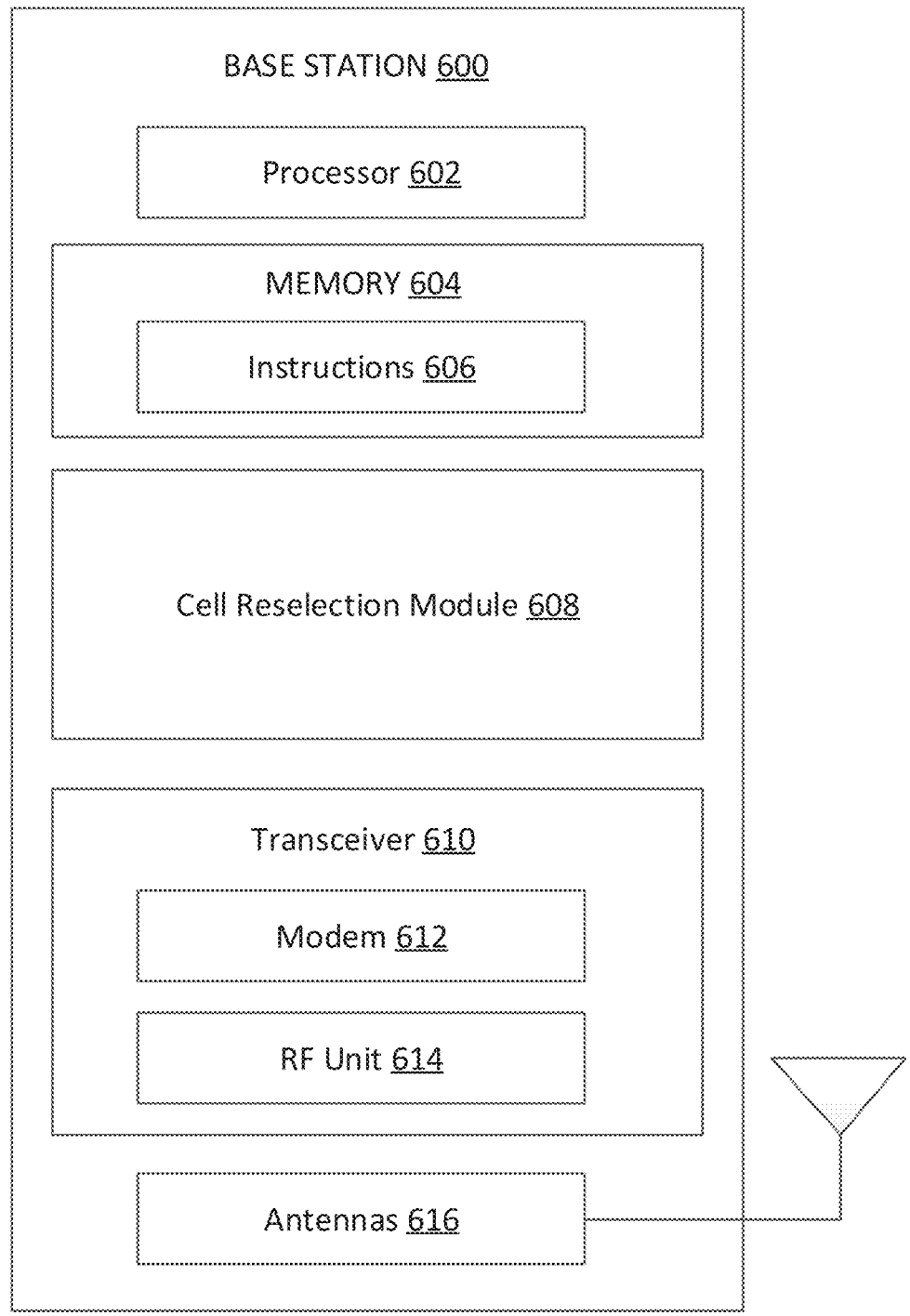
FIG. 6 is a block diagram of an exemplary base station (BS) according to some embodiments of the present disclosure.

FIG. 6 is a block diagram of an exemplary BS 600 according to embodiments of the present disclosure. The BS 600 may be a BS 105 in the network 100, a BS 205 in the network 200, and/or one of the BSs 405 as discussed above. A shown, the BS 600 may include a processor 602, a memory 604, a system information module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 2-4. Instructions 606 may also be referred to as code, which may be interpreted broadly to include any type of computer-readable statement(s).

The system information module 608 may be implemented via hardware, software, or combinations thereof. For example, the system information module 608 may be implemented as a processor, circuit, and/or instructions 606 stored in the memory 604 and executed by the processor 602. In some examples, the system information module 608 can be integrated within the modem subsystem 612. For example, the system information module 608 can be implemented by a combination of software components (e.g., executed by a DSP or a general processor) and hardware components (e.g., logic gates and circuitry) within the modem subsystem 612.

The system information module 608 may be used for various aspects of the present disclosure, for example, aspects of FIGS. 2-4. The system information module 608 is configured to transmit broadcast system information periodically according to certain schedules to enable a UE (e.g., the UEs 115, 215, and 500) to perform initial network access, cell selection, and/or fast cell reselection, as described in greater detail herein. For example, the broadcast system information may include SSBs, PSS, SSS, PBCH signals, MIB, and/or SIBs. Some example SIBs that may guide a UE in performing cell selection and/or reselection may include SIB2, SIB3, SIB4, and/or SIB5. In some aspects, the system information module 608 is configured to transmit dedicated signaling to the UE 500. The dedicated signaling may include a connection release message, for example. In some aspects, the dedicated signaling may include or indicate dedicated cell reselection information. The dedicated cell reselection information may include dedicated cell reselection priority configurations and/or reselection timers. In some aspects, the system information module 608 may transmit dedicated mobility control information that is empty. For example, the system information module 608 may transmit a connection release message including a idleModeMobilityControlInfo IE, where the idleModeMobilityControlInfo IE is empty. In another example, the system information module 708 may transmit a connection release message including a CellReselectionPriorities IE, where the CellReselectionPriorities IE is empty.

As shown, the transceiver 610 may include the modem subsystem 612 and the RF unit 614. The transceiver 610 can be configured to communicate bi-directionally with other devices, such as the UEs 115 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115, 215, or 500. The RF unit 614 may be further configured to perform analog beamforming in conjunction with the digital beamforming. Although shown as integrated together in transceiver 610, the modem subsystem 612 and/or the RF unit

614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to embodiments of the present disclosure. The antennas 616 may further receive data messages transmitted from other devices and provide the received data messages for processing and/or demodulation at the transceiver 610. The antennas 616 may include multiple antennas of similar or different designs in order to sustain multiple transmission links.

In an embodiment, the BS 600 can include multiple transceivers 610 implementing different RATs (e.g., NR and LTE). In an embodiment, the BS 600 can include a single transceiver 610 implementing multiple RATs (e.g., NR and LTE). In an embodiment, the transceiver 610 can include various components, where different combinations of components can implement RATs.

Figure 7:
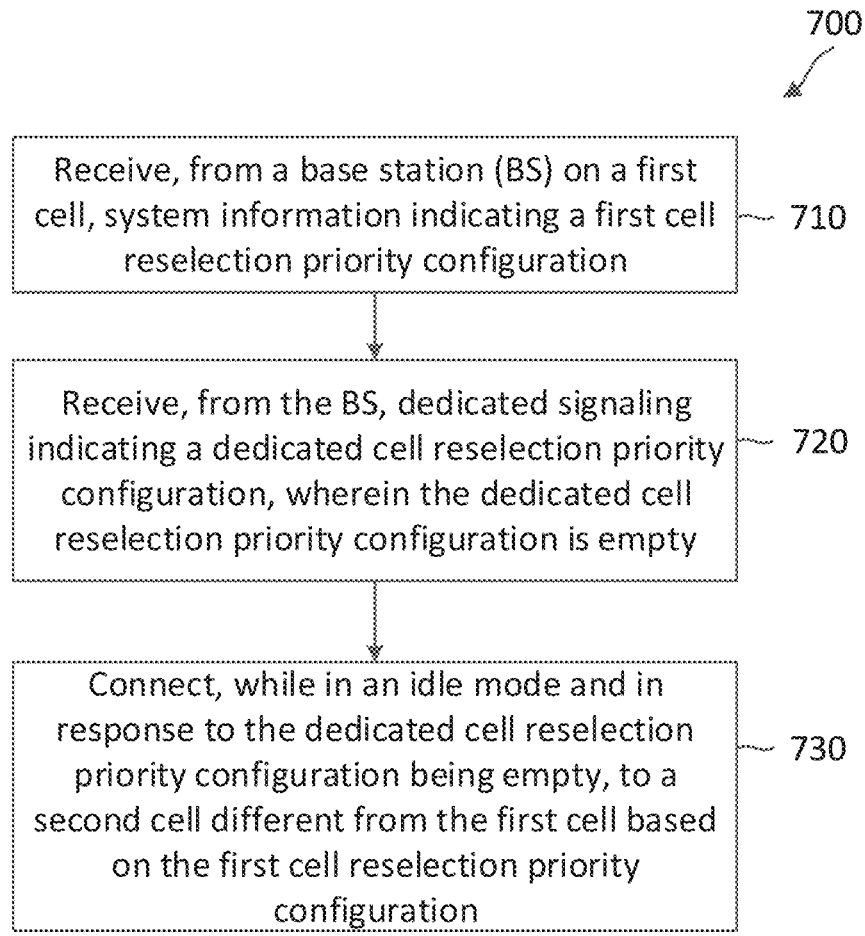
FIG. 7 is a flow diagram of a cell reselection method with improved idle mode mobility robustness according to some embodiments of the present disclosure.

FIG. 7 is a flow diagram of a cell reselection method 700 with improved idle mode mobility robustness according to some embodiments of the present disclosure. Steps of the method 700 can be executed by a computing device (e.g., a processor, processing circuit, and/or other suitable component) of a wireless communication device or other suitable means for performing the steps. For example, a wireless communication device, such as the UE 115, UE 215, or UE 500, may utilize one or more components, such as the processor 502, the memory 504, the cell reselection module 508, the transceiver 510, the modem 512, and the one or more antennas 516, to execute the steps of method 700. The method 700 may employ similar mechanisms as in the methods 300 and 400 described with respect to FIGS. 3 and 4, respectively. As illustrated, the method 700 includes a number of enumerated steps, but embodiments of the method 700 may include additional steps before, after, and in between the enumerated steps. In some embodiments, one or more of the enumerated steps may be omitted or performed in a different order.

At step 710, the UE receives, from a BS on a first cell, system information indicating a first cell reselection priority configuration. In some aspects, the UE may be in an active or connected mode with the network via the BS at step 710. For example, the UE and the BS may be in a RRC Connected mode. In some aspects, receiving the system information may include receiving s system information block (SIB) message indicating the first cell reselection priority configuration. For example, step 710 may include receiving, from the BS on the first cell, a SIB1, SIB2, SIB3, SIB4, SIB5, SIB24, and/or any other suitable SIB message. In other aspects, receiving the system information includes receiving a master information block (MIB) indicating the first cell reselection priority configuration. The first cell reselection priority configuration may indicate, for each of one or more neighboring cells, a value associated with the reselection priority of that cell. For example, the first cell reselection priority configuration may indicate an integer value from 0 to 7, where 7 is the highest priority value and 0 is the lowest priority value. In some aspects, the first cell reselection priority configuration may further indicate a reselection sub-priority for each cell. The reselection sub-priority may include or indicate a fractional value to be added to the priority value described above. The UE may be configured to evaluate neighboring cells based on the indicated cell reselection priority configuration. For example, the UE may be configured to evaluate a neighboring cell with a higher priority than the connected cell to determine if the higher-priority neighboring cell meets the signal energy and/or quality criteria for reselection. If the UE determines that the higher priority cell satisfies the signal energy (e.g., RSRP) and/or quality (RSRQ) criteria, the UE may establish a connection with the higher priority cell and camp on that cell.

At step 720, the UE receives, from the BS, dedicated signaling indicating a dedicated cell reselection priority configuration, where the dedicated cell reselection priority configuration is empty. In some aspects, receiving the dedicated signaling includes receiving the dedicated signaling via a RRC communication or message. In other aspects, receiving the dedicated signaling includes receiving a media access control-control element (MAC-CE), and/or a MAC protocol data unit (PDU). In one example, receiving the dedicated signaling includes receiving a connection release message, such as a RRCConnectionRelease message. The UE may be configured to enter an idle mode in response to receiving the connection release message.

In one aspect, the dedicated signaling includes or indicates dedicated cell reselection information. For example, the dedicated signaling may include idleModeMobilityControlInfo, CellReselectionPriorities, and/or any other suitable IE associated with cell reselection. In some instances, receiving the dedicated signaling indicating the cell reselection IE may indicate, to the UE, that a dedicated reselection priority is present in the dedicated signaling. Accordingly, the UE may be configured, in some instances, to ignore or disregard the first cell reselection priority configuration carried in the system information in favor of the dedicated reselection priority information carried in the cell reselection IE. However, as mentioned above, the dedicated cell reselection priority configuration may be empty. For example, in some aspects, step 720 includes receiving dedicated signaling carrying a cell reselection IE, where the cell reselection IE indicates no cell reselection priorities for any neighboring cells. In some aspects, the cell reselection IE may also indicate no timers (e.g., T320 timer) for performing the cell reselection. Accordingly, the UE may enter an idle mode and initiate a cell search and/or idle mode mobility protocol to identify a suitable cell.

Accordingly, in step 730, the UE connects, while in an idle mode and in response to the dedicated cell reselection priority configuration being empty, to a second cell based on the first cell reselection priority configuration received at step 710. The second cell may be different from the first cell. In some aspects, step 730 includes the UE determining, based on the dedicated signaling, whether the dedicated cell reselection priority configuration is empty. For example, the dedicated signaling may include a RRCConnectionRelease message carrying idleModeMobilityControlInfo. The UE may determine whether the idleModeMobilityControlInfo indicates any reselection priorities for any neighboring cells, and/or whether the idleModeMobilityControlInfo indicates a T320 timer. Based on determining that the idleModeMobilityControlInfo is empty (i.e., does not include or indicate any dedicated cell reselection priorities), the UE may perform an idle mode mobility procedure to evaluate neighboring cells based on the priorities indicated in the system information received at step 710. In another example, the dedicated signaling may include a RRC message carrying CellReselectionPriorities. The UE may determine whether the CellReselectionPriorities indicates any reselection priorities for any neighboring cells, and/or whether the CellReselectionPriorities indicates a T320 timer. Based on determining that the CellReselectionPriorities is empty (i.e., does not include or indicate any dedicated cell reselection priorities), the UE may perform an idle mode mobility procedure to evaluate neighboring cells based on the priorities indicated in the system information.

In some aspects, step 730 may include the UE measuring, based on the first cell reselection priority configuration, at least one of a signal power (e.g., RSRP) or a signal quality (e.g., RSRQ), and comparing the at least one of the signal power or the signal quality to a corresponding threshold. In some aspects, the UE may identify or select, based on the system information, the second cell associated with a higher priority than the connected cell. The UE may then tune to the frequency band associated with the second cell, and perform the signal power and/or signal quality measurements. If the signal power and/or signal quality measurements satisfy the corresponding threshold(s) and the measured second cell is associated with a higher priority than the connected first cell, the UE may initiate a cell reselection procedure to camp on the second cell. In some aspects, the first cell and the second cell may be associated with a same radio access technology (RAT). In other aspects, the first cell and the second cell may be associated with different RATs. For example, the first cell may be an LTE cell, and the second cell may be an NR cell.

Exemplary Aspects of the Disclosure

Aspect 1. A method for wireless communication performed by a user equipment (UE), comprising: receiving, from a base station (BS) on a first cell, system information indicating a first cell reselection priority configuration; receiving, from the BS, dedicated signaling indicating a dedicated cell reselection priority configuration, wherein the dedicated cell reselection priority configuration is empty; and connecting, while in an idle mode and in response to the dedicated cell reselection priority configuration being empty, to a second cell different from the first cell based on the first cell reselection priority configuration received in the system information.

Aspect 2. The method of aspect 1, wherein the receiving the dedicated signaling comprises receiving the dedicated signaling via a radio resource control (RRC) communication.

Aspect 3. The method of any of aspects 1-2, wherein the receiving the dedicated signaling comprises receiving a connection release message.

Aspect 4. The method of aspect 3, wherein the connection release message includes a cell reselection information element (IE), wherein the cell reselection IE is empty.

Aspect 5. The method of any of aspects 1-4, wherein the dedicated signaling indicates a timer configuration, wherein the timer configuration is empty.

Aspect 6. The method of any of aspects 1-5, wherein the connecting comprises: measuring, based on the first cell reselection priority configuration, a signal power of a reference signal in a frequency band associated with the second cell; and comparing the signal power to a threshold.

Aspect 7. The method of any of aspects 1-6, wherein the receiving the system information comprises receiving a system information block (SIB) message.

Aspect 8. The method of aspect 7, wherein the receiving the SIB message comprises receiving a SIB24 message, and wherein the second cell is associated with a 5G new radio (NR) radio access technology (RAT).

Aspect 9. A user equipment (UE), comprising: a processor and a transceiver in communication with the processor, wherein the processor and the transceiver are configured to: receive, from a base station (BS) on a first cell, system information indicating a first cell reselection priority configuration; receive, from the BS, dedicated signaling indicating a dedicated cell reselection priority configuration, wherein the dedicated cell reselection priority configuration is empty; and connect, while in an idle mode and in response to the dedicated cell reselection priority configuration being empty, to a second cell different from the first cell based on the first cell reselection priority configuration received in the system information.

Aspect 10. The UE of aspect 9, wherein the processor and the transceiver are configured to receive the dedicated signaling via a radio resource control (RRC) communication.

Aspect 11. The UE of any of aspects 9-10, wherein the processor and the transceiver configured to receive the dedicated signaling comprises the processor and the transceiver configured to receive a connection release message.

Aspect 12. The UE of aspect 11, wherein the connection release message includes a cell reselection information element (IE), wherein the cell reselection IE is empty.

Aspect 13. The UE of any of aspects 9-12, wherein the dedicated signaling indicates a timer configuration, wherein the timer configuration is empty.

Aspect 14. The UE of any of aspects 9-13, wherein the processor and the transceiver configured to connect to the second cell comprises the processor and the transceiver configured to: measure, based on the first cell reselection priority configuration, a signal power of a reference signal in a frequency band associated with the second cell; and compare the signal power to a threshold.

Aspect 15. The UE of any of aspects 9-14, wherein the processor and the transceiver configured to receive the system information comprises the processor and the transceiver configured to receive a system information block (SIB) message.

Aspect 16. The UE of aspect 15, wherein the processor and the transceiver configured to receive the SIB message comprises processor and the transceiver configured to receive a SIB24 message, and wherein the second cell is associated with a 5G new radio (NR) radio access technology (RAT).

Aspect 17. A non-transitory, computer-readable medium having program code recorded thereon, wherein the program code comprises instructions executable by a processor to cause a user equipment (UE) to: receive, from a base station (BS) on a first cell, system information indicating a first cell reselection priority configuration; receive, from the BS, dedicated signaling indicating a dedicated cell reselection priority configuration, wherein the dedicated cell reselection priority configuration is empty; and connect, while in an idle mode and in response to the dedicated cell reselection priority configuration being empty, to a second cell different from the first cell based on the first cell reselection priority configuration received in the system information.

Aspect 18. The non-transitory, computer-readable medium of aspect 17, wherein the code for causing the UE to receive the dedicated signaling comprises code for causing the UE receive the dedicated signaling via a radio resource control (RRC) communication.

Aspect 19. The non-transitory, computer-readable medium of any of aspects 17-18, wherein the code for causing the UE to receive the dedicated signaling comprises code for causing the UE to receive a connection release message.

Aspect 20. The non-transitory, computer-readable medium of aspect 19, wherein the connection release message includes a cell reselection information element (IE), wherein the cell reselection IE is empty.

Aspect 21. The non-transitory, computer-readable medium of any of aspects 17-20, wherein the dedicated signaling indicates a timer configuration, wherein the timer configuration is empty.

Aspect 22. The non-transitory, computer-readable medium of any of aspects 17-21, wherein the code for causing the UE to connect to the second cell comprises code for causing the UE to: measure, based on the first cell reselection priority configuration, a signal power of a reference signal in a frequency band associated with the second cell; and compare the signal power to a threshold.

Aspect 23. The non-transitory, computer-readable medium of any of aspects 17-23, wherein the code for causing the UE to receive the system information comprises code for causing the UE to receive a system information block (SIB) message.

Aspect 24. The non-transitory, computer-readable medium of aspect 23, wherein the code for causing the UE to receive the SIB message comprises code for causing the UE to receive a SIB24 message, and wherein the second cell is associated with a 5G new radio (NR) radio access technology (RAT).

Aspect 25. A user equipment (UE), comprising: means for receiving, from a base station (BS) on a first cell, system information indicating a first cell reselection priority configuration; means for receiving, from the BS, dedicated signaling indicating a dedicated cell reselection priority configuration, wherein the dedicated cell reselection priority configuration is empty; and means for connecting, while in an idle mode and in response to the dedicated cell reselection priority configuration being empty, to a second cell different from the first cell based on the first cell reselection priority configuration received in the system information.

Aspect 26. The UE of aspect 25, wherein the means for receiving the dedicated signaling comprises means for receiving the dedicated signaling via a radio resource control (RRC) communication.

Aspect 27. The UE of any of aspects 25-26, wherein the means for receiving the dedicated signaling comprises means for receiving a connection release message.

Aspect 28. The UE of aspect 27, wherein the connection release message includes a cell reselection information element (IE), wherein the cell reselection IE is empty.

Aspect 29. The UE of any of aspects 25-28, wherein the dedicated signaling indicates a timer configuration, wherein the timer configuration is empty.

Aspect 30. The UE of any of aspects 25-29, wherein the means for connecting comprises: means for measuring, based on the first cell reselection priority configuration, a signal power of a reference signal in a frequency band associated with the second cell; and means for comparing the signal power to a threshold.

Aspect 31. The UE of any of aspects 25-30, wherein the means for receiving the system information comprises means for receiving a system information block (SIB) message.

Aspect 32. The UE of aspect 31, wherein the means for receiving the SIB message comprises means for receiving a SIB24 message, and wherein the second cell is associated with a 5G new radio (NR) radio access technology (RAT).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication performed by a user equipment (UE), comprising:
    receiving, from a base station (BS) on a first cell, system information indicating a first cell reselection priority configuration;
    receiving, from the BS, dedicated signaling indicating a dedicated cell reselection priority configuration, wherein the dedicated cell reselection priority configuration is empty; and
    connecting, while in an idle mode and in response to the dedicated cell reselection priority configuration being empty, to a second cell different from the first cell based on the first cell reselection priority configuration received in the system information.

2. The method of claim 1, wherein the receiving the dedicated signaling comprises receiving the dedicated signaling via a radio resource control (RRC) communication.

3. The method of claim 1, wherein the receiving the dedicated signaling comprises receiving a connection release message.

4. The method of claim 3, wherein the connection release message includes a cell reselection information element (IE), wherein the cell reselection IE is empty.

5. The method of claim 1, wherein the dedicated signaling indicates a timer configuration, wherein the timer configuration is empty.

6. The method of claim 1, wherein the connecting comprises:
measuring, based on the first cell reselection priority configuration, a signal power of a reference signal in a frequency band associated with the second cell; and
comparing the signal power to a threshold.

7. The method of claim 1, wherein the receiving the system information comprises receiving a system information block (SIB) message.

8. The method of claim 7, wherein the SIB message indicates, for each of one or more neighboring cells, a frequency band and a priority value.

9. A user equipment (UE), comprising:
a processor and a transceiver in communication with the processor, wherein the processor and the transceiver are configured to:
receive, from a base station (BS) on a first cell, system information indicating a first cell reselection priority configuration;
receive, from the BS, dedicated signaling indicating a dedicated cell reselection priority configuration, wherein the dedicated cell reselection priority configuration is empty; and
connect, while in an idle mode and in response to the dedicated cell reselection priority configuration being empty, to a second cell different from the first cell based on the first cell reselection priority configuration received in the system information.

10. The UE of claim 9, wherein the processor and the transceiver are configured to receive the dedicated signaling via a radio resource control (RRC) communication.

11. The UE of claim 9, wherein the processor and the transceiver configured to receive the dedicated signaling comprises the processor and the transceiver configured to receive a connection release message.

12. The UE of claim 11, wherein the connection release message includes a cell reselection information element (IE), wherein the cell reselection IE is empty.

13. The UE of claim 9, wherein the dedicated signaling indicates a timer configuration, wherein the timer configuration is empty.

14. The UE of claim 9, wherein the processor and the transceiver configured to connect to the second cell comprises the processor and the transceiver configured to:
measure, based on the first cell reselection priority configuration, a signal power of a reference signal in a frequency band associated with the second cell; and
compare the signal power to a threshold.

15. The UE of claim 9, wherein the processor and the transceiver configured to receive the system information comprises the processor and the transceiver configured to receive a system information block (SIB) message.

16. The UE of claim 15, wherein the SIB message indicates, for each of one or more neighboring cells, a frequency band and a priority value.

17. A non-transitory, computer-readable medium having program code recorded thereon, wherein the program code comprises instructions executable by a processor to cause a user equipment (UE) to:
receive, from a base station (BS) on a first cell, system information indicating a first cell reselection priority configuration;
receive, from the BS, dedicated signaling indicating a dedicated cell reselection priority configuration, wherein the dedicated cell reselection priority configuration is empty; and
connect, while in an idle mode and in response to the dedicated cell reselection priority configuration being empty, to a second cell different from the first cell based on the first cell reselection priority configuration received in the system information.

18. The non-transitory, computer-readable medium of claim 17, wherein the code for causing the UE to receive the dedicated signaling comprises code for causing the UE receive the dedicated signaling via a radio resource control (RRC) communication.

19. The non-transitory, computer-readable medium of claim 17, wherein the code for causing the UE to receive the dedicated signaling comprises code for causing the UE to receive a connection release message.

20. The non-transitory, computer-readable medium of claim 19, wherein the connection release message includes a cell reselection information element (IE), wherein the cell reselection IE is empty.

21. The non-transitory, computer-readable medium of claim 17, wherein the dedicated signaling indicates a timer configuration, wherein the timer configuration is empty.

22. The non-transitory, computer-readable medium of claim 17, wherein the code for causing the UE to connect to the second cell comprises code for causing the UE to:
measure, based on the first cell reselection priority configuration, a signal power of a reference signal in a frequency band associated with the second cell; and
compare the signal power to a threshold.

23. The non-transitory, computer-readable medium of claim 17, wherein the code for causing the UE to receive the system information comprises code for causing the UE to receive a system information block (SIB) message.

24. The non-transitory, computer-readable medium of claim 23, wherein the SIB message indicates, for each of one or more neighboring cells, a frequency band and a priority value.

25. A user equipment (UE), comprising:
means for receiving, from a base station (BS) on a first cell, system information indicating a first cell reselection priority configuration;
means for receiving, from the BS, dedicated signaling indicating a dedicated cell reselection priority configuration, wherein the dedicated cell reselection priority configuration is empty; and
means for connecting, while in an idle mode and in response to the dedicated cell reselection priority configuration being empty, to a second cell different from the first cell based on the first cell reselection priority configuration received in the system information.

26. The UE of claim 25, wherein the means for receiving the dedicated signaling comprises means for receiving the dedicated signaling via a radio resource control (RRC) communication.

27. The UE of claim 25, wherein the means for receiving the dedicated signaling comprises means for receiving a connection release message.

28. The UE of claim 27, wherein the connection release message includes a cell reselection information element (IE), wherein the cell reselection IE is empty.

29. The UE of claim 25, wherein the dedicated signaling indicates a timer configuration, wherein the timer configuration is empty.

30. The UE of claim 25, wherein the means for connecting comprises:
   means for measuring, based on the first cell reselection priority configuration, a signal power of a reference signal in a frequency band associated with the second cell; and
   means for comparing the signal power to a threshold.

\* \* \* \* \*